J. L. HECHT.
METHOD OF MAKING METAL WHEEL HUBS.
APPLICATION FILED JUNE 12, 1920.
1,409,175.
Patented Mar. 14, 1922.
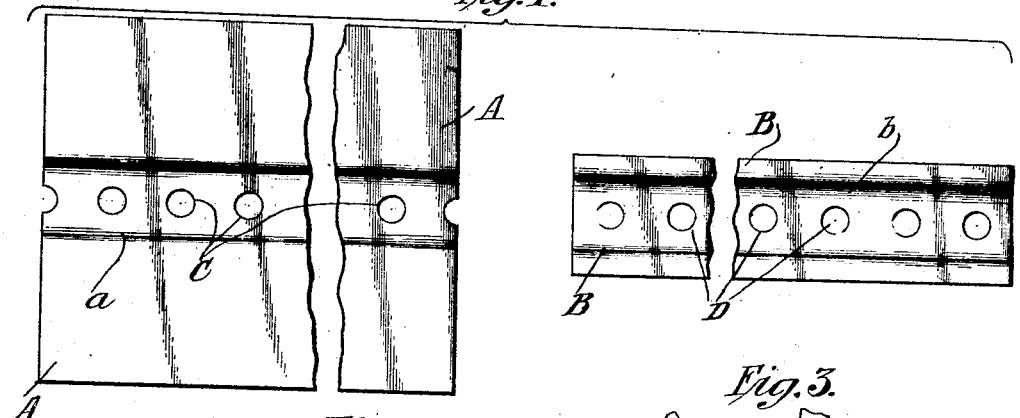
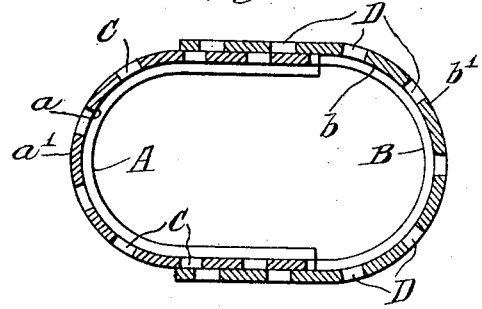
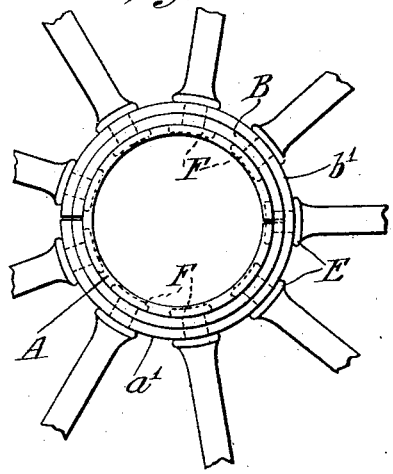
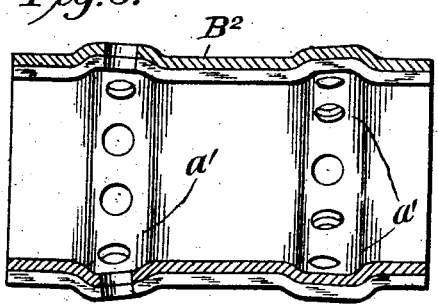
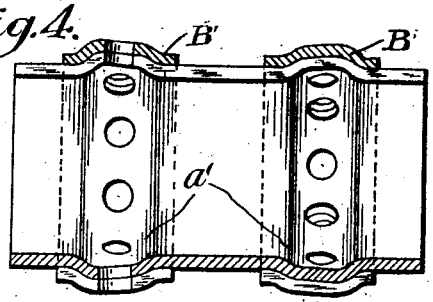
Inventor:
J. L. Hecht
by Rogers, Kennedy Campbell Attys

UNITED STATES PATENT OFFICE.

JOSEPH L. HECHT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT.

METHOD OF MAKING METAL WHEEL HUBS.

1,409,175.  Specification of Letters Patent.  Patented Mar. 14, 1922.

Application filed June 12, 1920. Serial No. 388,476.

*To all whom it may concern:*

Be it known that I, JOSEPH L. HECHT, a citizen of the United States, residing at Davenport, in the county of Scott and State of Iowa, have invented certain new and useful Improvements in Methods of Making Metal Wheel Hubs, of which the following is a specification, reference being had therein to the accompanying drawing, being a continuation in part of original application filed April 11, 1919, Serial No. 289,371.

This invention relates to the manufacture of tubular metal wheel hubs, more particularly of the form in which a circumferential groove or spoke chamber is provided on the interior of the hub to receive heads on the inner ends of the spokes by which the latter are riveted to the hub, the object of the invention being to produce a hub of great strength and durability and in which the spoke chamber or chambers will be reinforced and capable of withstanding the severe strains imposed at the points where the spokes are fastened in place. With these ends in view my invention consists of an improved method of forming the hub, in which method two blanks are assembled one within the other to form a hollow cylindrical hub structure composed of two thicknesses or layers of material, which layers are caused to interlock with each other by interfitting protuberances and grooves on the respective layers; whereby there is formed a hub having an internal spoke chamber which is reinforced by an external reinforcing member. The present invention is directed to the method involved in forming a hub structure of the characteristics and form described and claimed in an application for Letters Patent of the United States filed by me on the 11th day of April, 1919, Serial No. 289,371 of which this method application is a continuation in part.

The interlocking of the grooves and protuberances on the respective layers of blanks composing the hub structure may be brought about in various ways, but in the accompanying drawings and description to follow one method of procedure is set forth by way of example.

In the accompanying drawings.

Fig. 1 is a plan view of two blanks for forming a hub by one course of procedure in accordance with my invention.

Fig. 2 is a sectional view showing the two blanks bent and assembled in an intermediate stage of the formation of the hub structure.

Fig. 3 is a similar view of the completed hub.

Figs. 4 and 5 are longitudinal sectional elevations of hub structures showing how my invention is applicable to hubs provided with two spoke chambers for the accommodation of two rows or ranks of spokes.

Referring to the drawings.

In carrying my improved method into effect by one course of procedure, I provide two blanks A and B in the form of metal plates or sheets, the blank A being of a form and size to constitute the hub proper or shell, and the blank B being of a form and size to constitute the reinforcing member thereof; and by suitable means and devices I bend the two blanks into general semicircular form so that the bent blank A can be assembled within the bent blank B with the curved portions thereof disposed outwardly as shown in Fig. 2. These blanks, either before being thus bent, or during the bending operation, are formed with longitudinal grooves $a$ and $b$ respectively, produced by forcing the material of the blank outward from one side along a longitudinal line, thereby throwing up on the other side longitudinal ribs $a'$ and $b'$ on the respective blanks. As a result, the blank A will have in one side a cavity or groove $a$ and on the other side a corresponding rib or protuberance $a'$, and the blank B will likewise have in one side a cavity or groove $b$ and on the other side a corresponding rib or protuberance $b'$, the protuberance on the blank A entering and interlocking with the groove in the blank B when the bent blanks are assembled as shown in Fig. 2. I next by suitable means and devices force the two assembled blanks closely together on each other and bend the ends of the blank B around the curved portion of the blank A, and bend the ends of blank A within and against the curved portion of the blank B, and finally bring the two blanks into true circular cylindrical form as shown in Fig.

3, thereby causing the blank B to closely surround the blank A and causing the protuberance on the blank A to interlock with the groove in the blank B. By these operations a hub shell is produced having on its interior a circumferential groove forming a spoke chamber, which spoke chamber is reinforced by a surrounding reinforcing member constituted by the blank B.

The protuberant portions of the two blanks are formed with holes C and D respectively to receive the spokes, which holes in the assembled blanks will register with each other so that the inner ends of the spokes can be passed therethrough and firmly riveted in place to secure the parts together, by the formation of shoulders E on the spokes bearing against the outer side of the reinforcing member, and heads F on the ends of the spokes seated in the spoke chamber and bearing against the inner side of the hub shell. The holes in the two blanks may be formed either before the blanks are bent into semicircular form, or may be punched or bored through the blanks after they are bent into their final cylindrical form as shown in Fig. 3.

By assembling the partially bent blanks one within the other as above described, when they are finally shaped into cylindrical form, the joints of the two blanks will be disposed out of line with each other and at diametrically opposite points; and the two bent blanks may be maintained in fixed relations to each other and connected together so as to preserve their cylindrical form, either by riveting the spokes thereto as above described, or by spot welding the two blanks, or by riveting them together by rivets, or by other suitable means.

In the accompanying drawings I have illustrated the practice of my method in connection with a hub structure provided with a single spoke chamber to receive a single row or rank of spokes, but it will be manifest that the invention is applicable as well in connection with the formation of a hub structure having two spoke chambers $a'$ as shown in Figs. 4 and 5 to receive two rows or ranks of spokes, in which event the surrounding reinforcing member may be either applied in the form of separate comparatively narrow members $B'$ as shown in Fig. 4, or in the form of a single member $B^2$ extending substantially throughout the length of the hub shell proper as shown in Fig. 5.

Having thus described my invention what I claim is:

1. The method of making wheel hubs with circumferential spoke chambers, which method consists in assembling two semicircular blanks one within the other, each with a groove in one side and a corresponding protuberance on the other side, and bending said assembled blanks into circular cylindrical form, while causing the protuberance on the inner blank to become interlocked in the groove in the surrounding blank.

2. The method of making wheel hubs with circumferential spoke chambers, which method consists in providing two blanks, bending said blanks into general semicircular form and providing each blank with a groove in one side and a corresponding protuberance on the other side, assembling the bent blanks one within the other with their curved portions disposed outwardly, forcing said blanks together on each other and bending them into circular cylindrical form with the protuberance on the inner blank interlocked in the groove in the outer blank.

In testimony whereof, I have affixed my signature hereto.

JOSEPH L. HECHT.